US007121679B2

(12) United States Patent
Fujimoto (10) Patent No.: US 7,121,679 B2
(45) Date of Patent: Oct. 17, 2006

(54) ILLUMINATION APPARATUS (75) Inventor: Takuya Fujimoto, Sakai (JP)

(73) Assignee: Cateye Co., Ltd., Osaka (JP)

( * ) Notice: Subject to any disclaimer, the term of this patent is extended or adjusted under 35 U.S.C. 154(b) by 169 days.

(21) Appl. No.: 10/910,700

(22) Filed: Aug. 3, 2004

(65) Prior Publication Data

US 2005/0047123 A1 Mar. 3, 2005

(30) Foreign Application Priority Data

Aug. 5, 2003 (JP) ............................. 2003-286923

(51) Int. Cl.
*F21L 4/04* (2006.01)
*F21V 7/04* (2006.01)
*F21V 21/08* (2006.01)
*F21V 23/04* (2006.01)
*F21L 4/02* (2006.01)

(52) U.S. Cl. ...................... 362/186; 362/191; 362/205; 362/555; 362/577

(58) Field of Classification Search ................ 362/184, 362/186–188, 205, 555, 577–579, 581
See application file for complete search history.

(56) References Cited

U.S. PATENT DOCUMENTS 4,760,504 A * 7/1988 Schaller et al. ............. 362/205
6,099,141 A * 8/2000 Landamia ................... 362/184
6,227,688 B1 * 5/2001 Taylor et al. ................ 362/191
6,685,336 B1 * 2/2004 Neiser ........................ 362/202
2003/0012025 A1 1/2003 Christen ..................... 362/362

FOREIGN PATENT DOCUMENTS

| DE | 29917634 | 1/2000 |
|---|---|---|
| DE | 19941987 | 3/2001 |
| JP | 2002-050212 | 2/2002 |
| JP | 2002-050213 | 2/2002 |
| WO | WO 9806975 | 2/1998 |

* cited by examiner

*Primary Examiner*—Alan Cariaso
(74) *Attorney, Agent, or Firm*—Olson & Hierl, Ltd.

(57) ABSTRACT

An illumination apparatus is provided that can achieve light distribution towards the front, and light illumination in a direction other than the front direction, without using a light source other than the light source for frontward illumination. The illumination apparatus includes a light emitting diode located at the front side of the illumination apparatus, corresponding to one end, a side transmission unit having a surface exposed at a gap in the casing, located rearward of the light emitting diode to transmit light from the side, and a light path modification unit, located rearward of the light emitting diode to modify the direction of light output from the light emitting diode towards the side transmission unit.

6 Claims, 8 Drawing Sheets

ILLUMINATION APPARATUS

BACKGROUND OF THE INVENTION

1. Field of the Invention

The present invention relates to illumination apparatuses, and more particularly, to an illumination apparatus employing LED (Light Emitting Diode).

2. Description of Related Art

The lighting apparatus attached to a bicycle must ensure favorable field of view in the frontward direction while suppressing excessive glare with respect to vehicles coming from the opposite direction. A conventional illumination apparatus is implemented as set forth below.

(a) The light emitted from the filament arranged in the proximity of the focal point of the parabolic mirror diverges in all directions. All the light other than the light emitted directly frontward is reflected at the parabolic mirror to form frontward parallel light rays. These light rays are set to form a predetermined light distribution by the front lens together with the light directly output frontward (for example, refer to Japanese Patent Laying-Open Nos. 2002-50212 and 2002-50213).

(b) The light emitted from the filament is set to form a desired light distribution by a multi-surface mirror to be output in the frontward direction. The front lens simply functions as a cover. In such a multi-surface mirror, the size and angle arrangement of respective portions are determined so that respective portions reflect the light from the filament to a predetermined direction and a desired light distribution can be achieved by the integration of respective portions (refer to Japanese Patent Laying-Open Nos. 2002-50212 and 2002-50213).

By using such illumination apparatuses, a desired light distribution can be achieved efficiently.

It is to be noted that if the illumination apparatus, whether employed for a bicycle or carried as a general illumination apparatus while walking, allows light to be emitted from the circumferential side region, for example, in addition to the forward direction, visual confirmation by a vehicle, particularly by an automobile, approaching from the lateral direction, i.e. from the side, is facilitated in the dark. Thus, the safety of the carrier of the illumination apparatus can be improved.

In the case where light is to be output from a region other than the frontward region, another light source, different from the light source for the frontward direction such as a side circumferential light source was conventionally employed. However, use of another light source is not preferable from the standpoint of reducing the size, weight and energy, as well as the fabrication cost.

SUMMARY OF THE INVENTION

An object of the present invention is to provide an illumination apparatus, not restricted to application to a bicycle, that can achieve light distribution towards the front, and light illumination in a direction other than the front direction, without using a light source other than the light source for frontward illumination.

According to an aspect of the present invention, an illumination apparatus attached to a casing includes a light emitting diode located at the front side of the illumination apparatus, corresponding to one end of the casing, a side transmission unit having a surface exposed at a gap in the casing, located rearward of the light emitting diode to transmit light from the side, and a light path modification unit located rearward of the light emitting diode to modify the direction of light output from the light emitting diode towards the side transmission unit.

By the structure set forth above, illumination in the frontward direction and illumination in the sideward direction can be achieved by a simple configuration using only the light emitting diode for forward illumination, dispensable of another light source for the sideward direction.

By using the illumination apparatus of the present invention, application of the illumination apparatus is not limited to bicycles, and illumination in the frontward direction and illumination around the illumination side region can be achieved without using a light source other than the light source for forward illumination. Thus, the size, weight, energy and cost can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
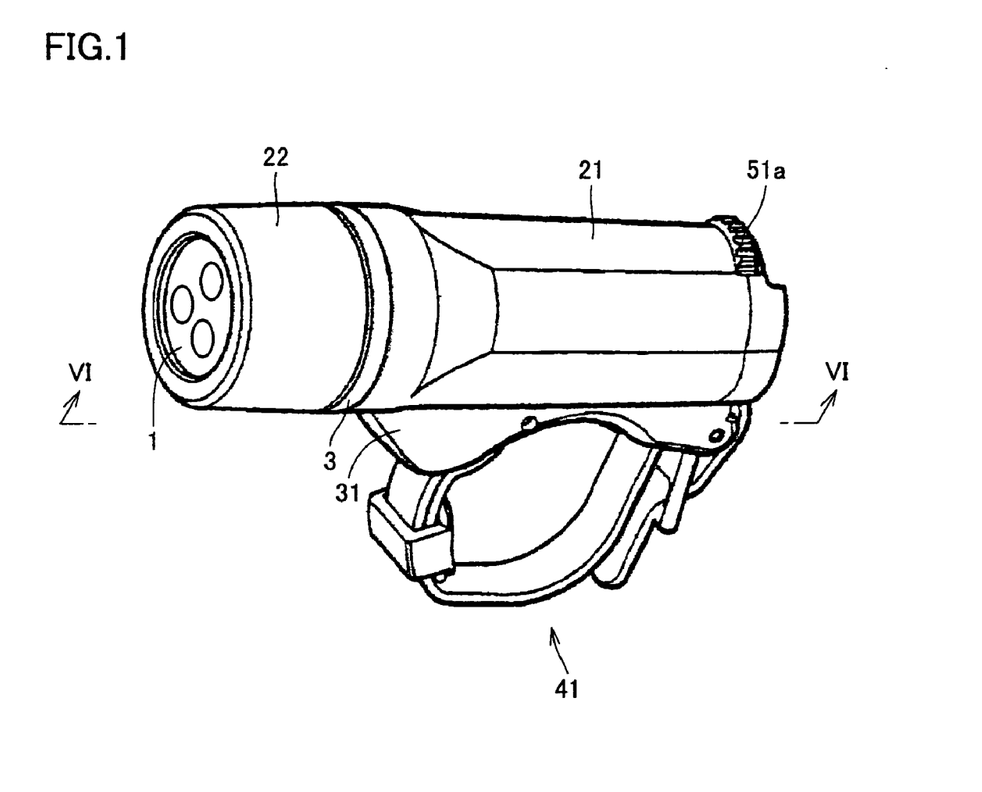
FIG. 1 is a perspective view of an illumination apparatus of an embodiment of the present invention.

An embodiment of the present invention will be described hereinafter with reference to the drawings. Referring to FIG. 1, an illumination apparatus of the present embodiment includes a front projection window 1 projecting light frontward, a front side cover 22 covering the side region, and a casing 21 located at the rear of cover 22 to accommodate components of the illumination apparatus. A side transmission unit 3 transmitting light from the side circumferential region is arranged between front side cover 22 and casing 21. Although not shown, light emitting diode is employed for the light source. A battery accommodated in casing 21 is employed as a power supply thereof.

A flat portion 21a is provided at the side area of casing 21. A support member 31 to support the illumination apparatus is attached to flat region 21a. The flat portion of the casing may be a bottom 21a. A fixture band 41 is attached to support member 31. Fixture band 41 fastens the illumination apparatus to a target object, i.e., an object to which the illumination apparatus is to be attached. The target object may be the handle of a bicycle or motorcycle, an appropriate rod-like object in a household environment, or the like.

At the rearmost region of the illumination apparatus, a switch operation unit 51a is arranged to turn on/off the open-close terminal of a light source circuit through movement in the circumferential direction.

Figure 2A:
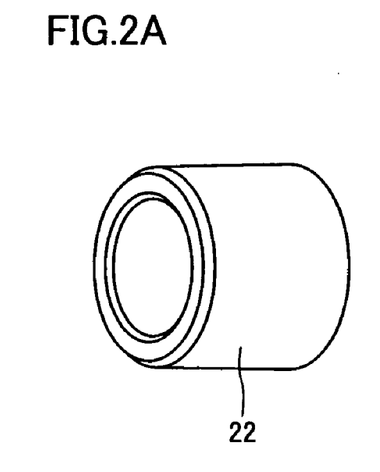
FIGS. 2A, 2B, 2C, 2D and 2E show a front side cover, a light emitting member, a light source alignment member, a connector member, and an LED, respectively.
Figure 2B:
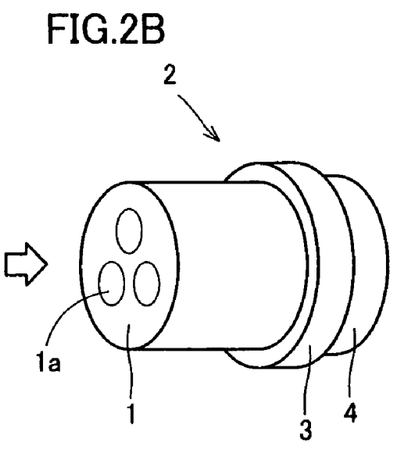

FIG. 2A shows an opaque cylindrical front side cover 22 with an open front end and an open back end. Cover 22 is formed of a plastic material of various types subjected to a plating process for metallic coating or a metal of various types such as aluminum. FIG. 2B shows a transparent cylindrical container-like light emission member 2. The rear end of light emission member 2 is open, and a condenser lens 1a and the like are arranged at the front side. A side (peripheral) transmission unit 3 is arranged at the side circumferential region of cylindrical light emission member 2. A casing insert portion 4 that is the portion to be fitted into the casing is provided at the rear region of light emission member 2.

Figures 2C, 2D:
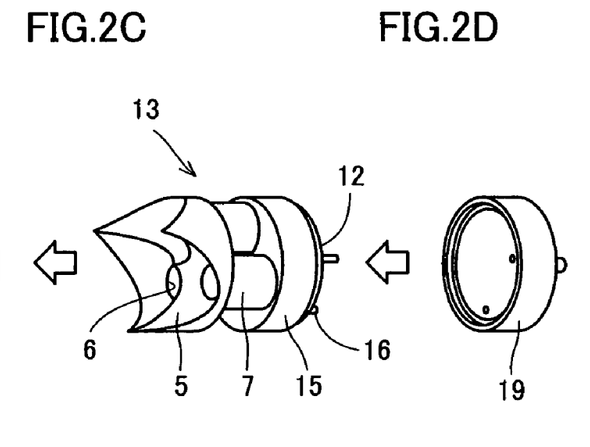

FIG. 2C shows a light source alignment member 13 where an LED is arranged as the light source. Light source alignment member 13 is fitted into the rear open end of light emission member 2 of FIG. 2B. The LED is attached to an LED insertion hole 6 of light source alignment member 13. The LED includes a small luminous unit that will be described afterwards. The luminous unit is located in front of LED insertion hole 6. In the present embodiment, three LEDs are employed with three corresponding LED insertion holes 5. LED insertion hole 6 opens along the axis (rotation axis) of a mirror 5 of a parabolic mirror of revolution (referred to as "revolution parabolic mirror" hereinafter) arranged so as to enclose the luminous unit of the LED from the back side. Revolution parabolic mirror 5 is subjected to a plating process for a metallic coating of high reflectance to improve the reflectance of revolution parabolic mirror 5.

A columnar LED support unit 7 is arranged for each LED behind LED insertion hole 6. A side transmission unit inner layer 15 is arranged at the rear of LED support unit 7 so as to overlap with side transmission unit 3 at the inner side of light emission member 2. A circular wiring board 12 to which a lead terminal from the LED is connected is located at the rear end of side transmission unit inner layer 15 so as to be fitted such that the circumference of wiring board 12 is surrounded by the edge of the end face of side transmission unit inner layer 15. A connection pin 16 protrudes outwards from the back of wiring board 12.

FIG. 2D shows a connector member 19 provided with a through hole (not shown) through which connection pin 16 passes. Connector member 19 is arranged behind and in contact with light source alignment member 13, and is located inside casing insert portion 4 that establishes mechanical connection to facilitate electrical connection.

Figure 2E:
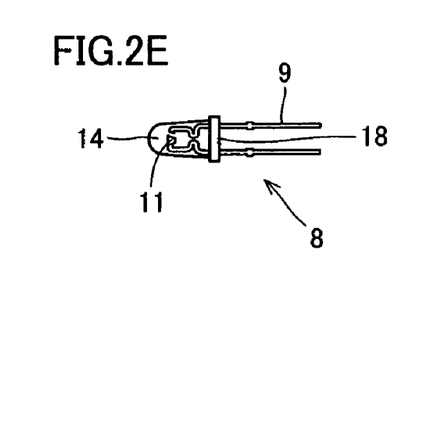

FIG. 2E shows an LED. LED 8 has a luminous unit 11 sealed with a transparent resin. A lead terminal 9 is drawn out from the trailing end face of the sealing resin. Lead terminal 9 serves to apply a current to luminous unit 11 of the LED. LED 8 is a bullet type LED, including a convex surface at the front side formed of transparent resin, and a flat face 18 is located at the back side. The surrounding of luminous unit 11 is absent of any light-blocking object. LED 8 is inserted into an LED insertion hole 6, as mentioned above. Lead terminal 9 passes through LED support unit 7 and side transmission unit inner layer 15 to be connected to wiring board 12.

Figure 3:
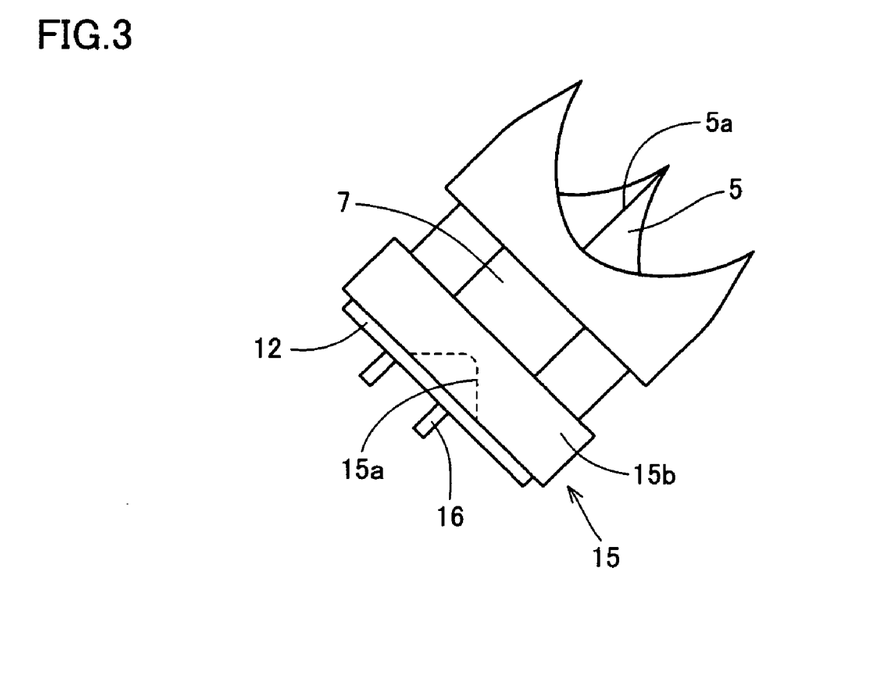
FIG. 3 shows the light source alignment member of FIG. 2C.

FIG. 3 is a diagram to describe in further detail the light source alignment member 13. One revolution parabolic mirror 5 is arranged for each LED, and separated from the parabolic mirror of the adjacent LED by a boundary line 5a. One LED support member 7 is provided for each LED. LED support member 7 is formed in a column configuration enclosing a cavity. The base of each column is continuous to side transmission unit inner layer 15. A conical dent 15a is provided at the trailing end face of side transmission unit inner layer 15.

Figure 4:
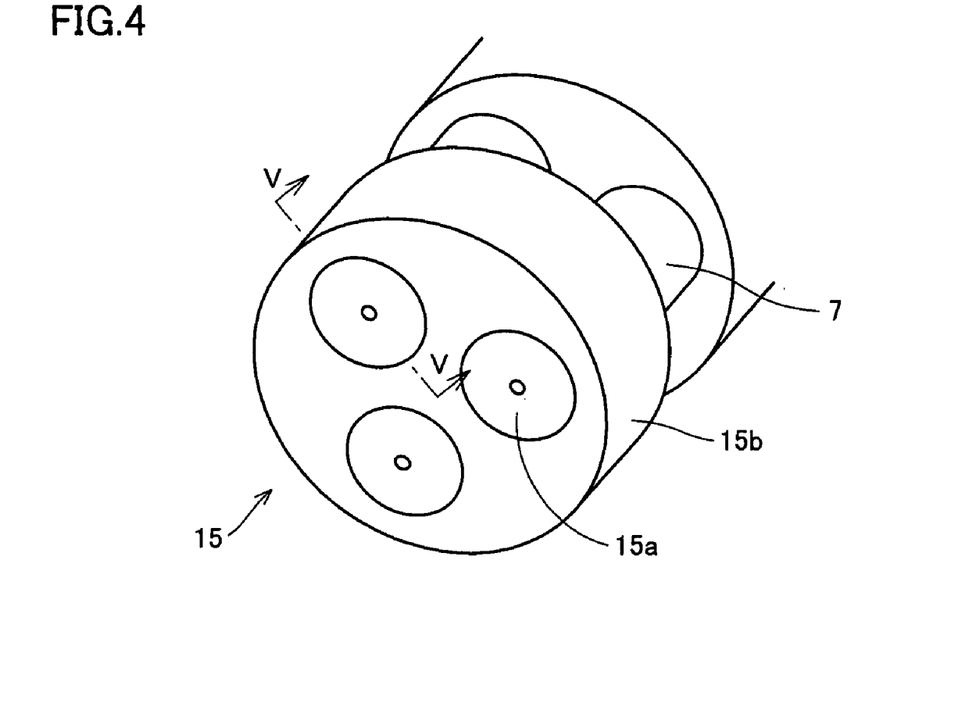
FIG. 4 is a bottom view (rear side) of the light source alignment member of FIG. 3.

FIG. 4 shows the trailing end face of side transmission unit inner layer 15 where conical dent 15a is provided at a position corresponding to the outer side transmission unit 3. The light output from the LED partially passes through the cavity of LED support member 7 to enter the optical medium material of side transmission unit inner layer 15 that has a refractive index higher than that of air. The light is totally reflected at the surface of conical dent 15a (interface of side transmission unit inner layer/air) at the trailing end of side transmission unit inner layer 15 towards an outer circumferential face 15b of side transmission unit inner layer 15. Side transmission unit inner layer 15 including conical dent 15a constitutes the light path modify unit. In other words, side transmission unit inner layer 15 can be identified as a light guide.

Figure 5:
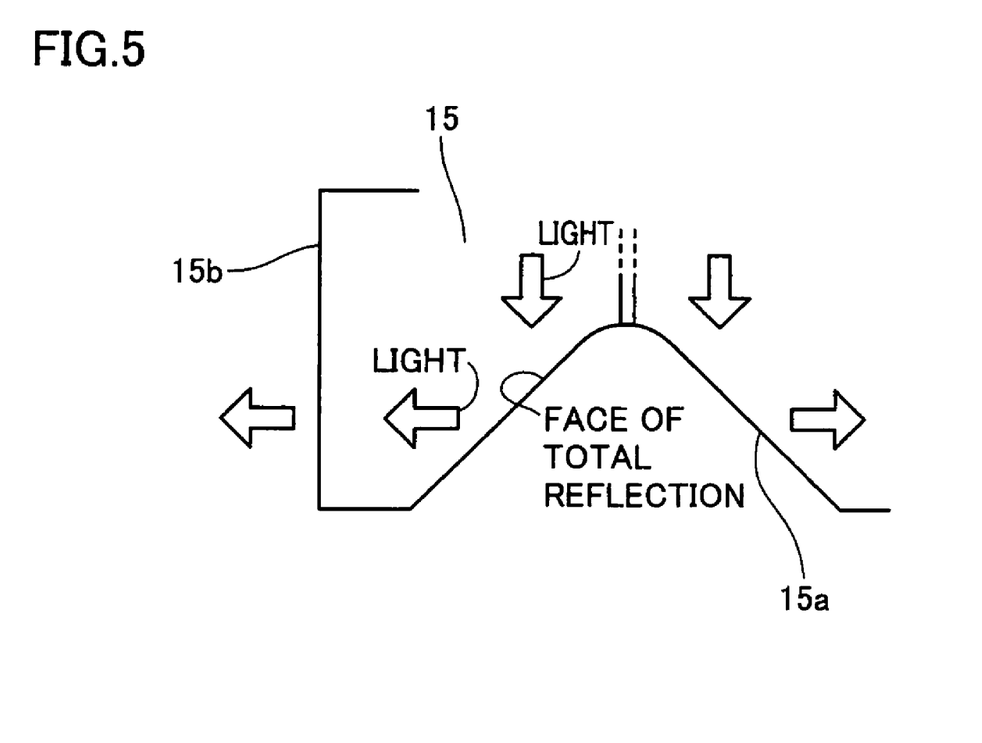
FIG. 5 is a sectional view of the light source alignment member taken along line V—V of FIG. 4.

FIG. 5 represents light traveling in the rear direction from LED support unit 7 through side transmission unit inner layer 15 to be totally reflected at the interface with air at conical dent 15a, whereby the direction of travel is modified sideways. Thus, light is output from outer circumferential plane 15b. The angle of the cone in the conical dent is set to achieve an inclination of approximately 45° so that the direction of travel is modified 90° by the aforementioned total reflection. The refractive index of the optical medium constituting side transmission unit inner layer 15 must be large enough to cause total reflection at the incident angle of 45°. Therefore, the refractive index of the optical medium that constitutes side transmission unit inner layer 15 must be at least 1.414.

Side transmission unit inner layer 15 and conical dent 15a set forth above constitute a light guide, and function as a light path modify unit. The LED support member may be viewed as a portion of the light guide.

Figure 6:
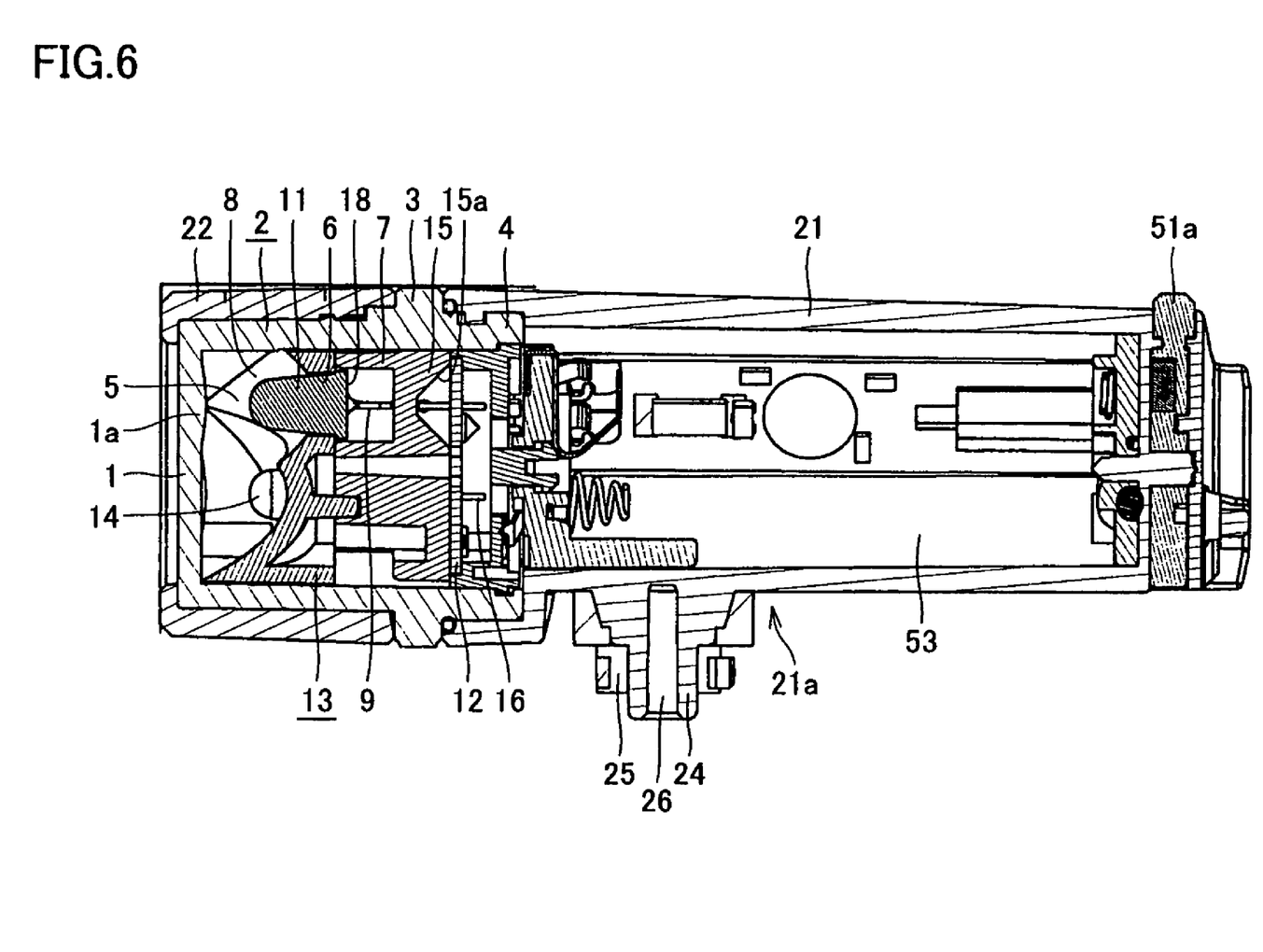
FIG. 6 is a sectional view of the illumination apparatus of FIG. 1 taken along line VI—VI.

FIG. 6 is a sectional view of the illumination apparatus of FIG. 1 taken along line VI—VI. The optical members shown in FIGS. 2A–2E are assembled at the left side of FIG. 6 (the front side of illumination apparatus). Front projection window 1, side transmission unit 3, and casing insert portion 4 are arranged in light emission member 2 that is formed of a transparent plastic member by integral forming. Front side cover 22 is arranged to cover the outer circumference of light emission member 2.

Light source alignment member 13 is accommodated in light emission member 2. LED 8 is inserted in LED insertion hole 6 of light source alignment member 13. Lead terminal 9 to introduce a current into luminous unit 11 is drawn out from the flat trailing face 18 of the LED to be connected to a connection portion (not shown) of wiring board 12 via LED support unit 7 and side transmission unit inner layer 15. Revolution parabolic mirror 5 is arranged so as to surround luminous unit 11 of LED 8 from the back side of the LED.

Front convex surface 14 constitutes the front side of LED 8. Condenser lens 1a is provided at the position facing the LED of front projection window 1. Since luminous unit 11 is located at the focal point of revolution parabolic mirror 5, the light emitted sideways from luminous unit 11 arrives at revolution parabolic mirror 5 to be reflected as a bundle of parallel rays frontward. Flat face 18 constitutes the trailing end of the LED. Columnar LED support unit 7 is located at the rear of the LED, and side transmission unit inner layer 15 is arranged further backward thereof. Side transmission unit 3 is located at the outer circumference of side transmission unit inner layer 15.

A battery container 53, for example, is provided in casing 21. The battery functions as an LED current power supply, or as the IC power supply of a switch circuit that will be described afterwards. Two lead terminals from each of the three LEDs are connected to wiring board 12. Wiring board 12 establishes connection so that the LEDs are connected in parallel. Two pins 16 supplying a current from the battery is provided for the LED connected in parallel at the rear side of wiring board 12.

An insertion shaft 24 to be inserted in support member 31 is provided protruding downwards at the bottom 21a of casing 21. An internal thread 26 is formed at the inner side of insertion shaft 24. A disk-like engagement member 25 is fixed at the outer circumference of insertion shaft 24. Specifically, an engagement member 25 having concave and convex grooves that engage lightly with the concave and convex grooves formed at the inner circumferential plane of support member 31 into which insertion shaft 24 is inserted is fastened. The function of engagement member 25 will be described afterwards.

A switch operation unit 51a that turns on/off luminous unit 11 is provided at the trailing end of casing 21. Switch operation unit 51a is moved in the circumferential direction of casing 21. Biasing force is applied resiliently to switch operation unit 51a in one direction along the circumference. The switch is turned on at a predetermined position where switch operation unit 51a is moved in an opposite direction around the circumference against the resilient biasing force. The switch attains an off state when switch operation unit 51a returns to its former position through the resilient force, absent of any additional application of force. The relationship between the on/off status of the switch and the on/off status of light emission of the LED will be described afterwards.

Figure 7:
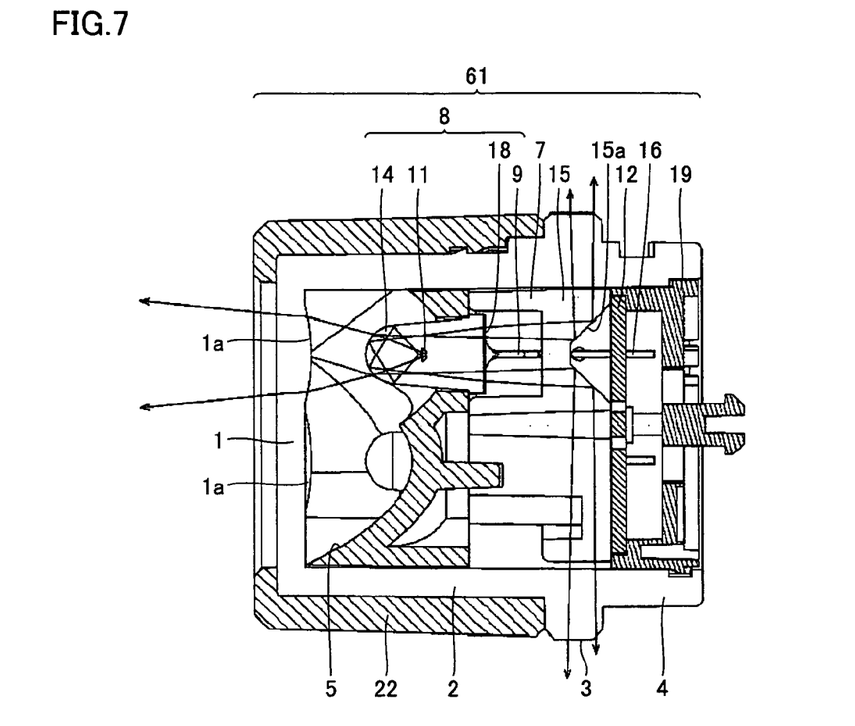
FIG. 7 is a sectional view of a front portion of the illumination apparatus of FIG. 1.

FIG. 7 is an enlarged sectional view of the peripheral region of the light source. LED 8 includes a front convex surface 14 through which light emitted forward from luminous unit 11 passes. This light has its enlargement of the luminous flux suppressed by condenser lens 1a to be emitted in the front direction. The backward light from luminous unit 11, totally reflected at the surface of the sealing resin to travel in the rear direction, is output from flat trailing end 18 to pass through the air in LED support unit 7 to enter side transmission unit inner layer 15. The light is propagated therethrough to arrive at conical dent 15a and totally reflected at the surface to have its direction of travel modified sidewards of side transmission unit inner layer 15. The light totally reflected at the region located at the immediate inner side of side transmission unit 3 passes through side transmission unit 3 to be emitted outside the illumination apparatus.

Connector member 19 arranged at the inner side of casing insert portion 4 includes a hole through which a lead line passes. The lead line is connected to pin 16 provided at the trailing end of wiring board 12.

Figure 8:
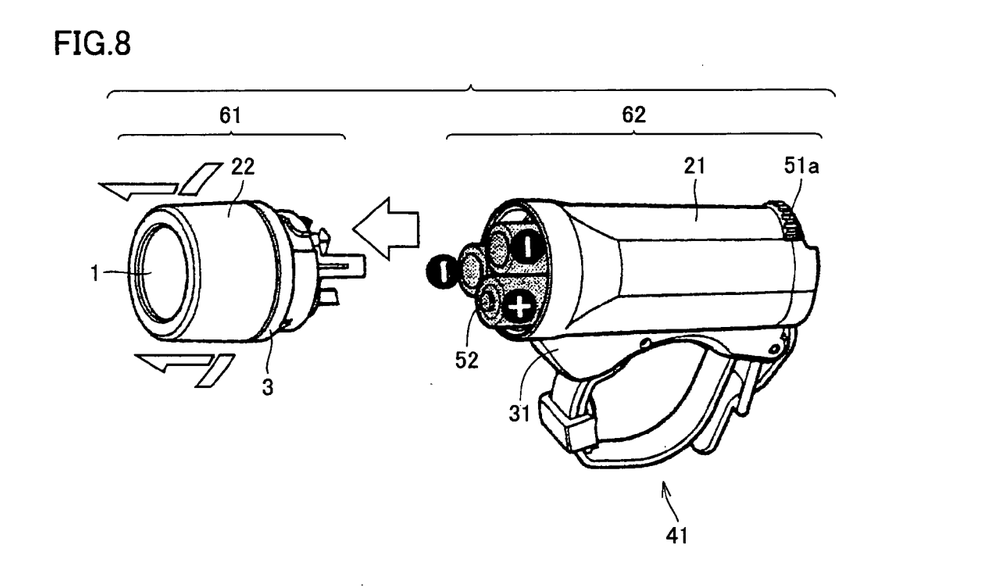
FIG. 8 represents the illumination apparatus of FIG. 1, divided into a front portion and a rear portion when the battery of the illumination apparatus of FIG. 1 is to be replaced.

Front unit 61 shown in FIG. 7 can be detached from casing 21 to allow exchange of battery 52, as shown in FIG. 8.

Figure 9:
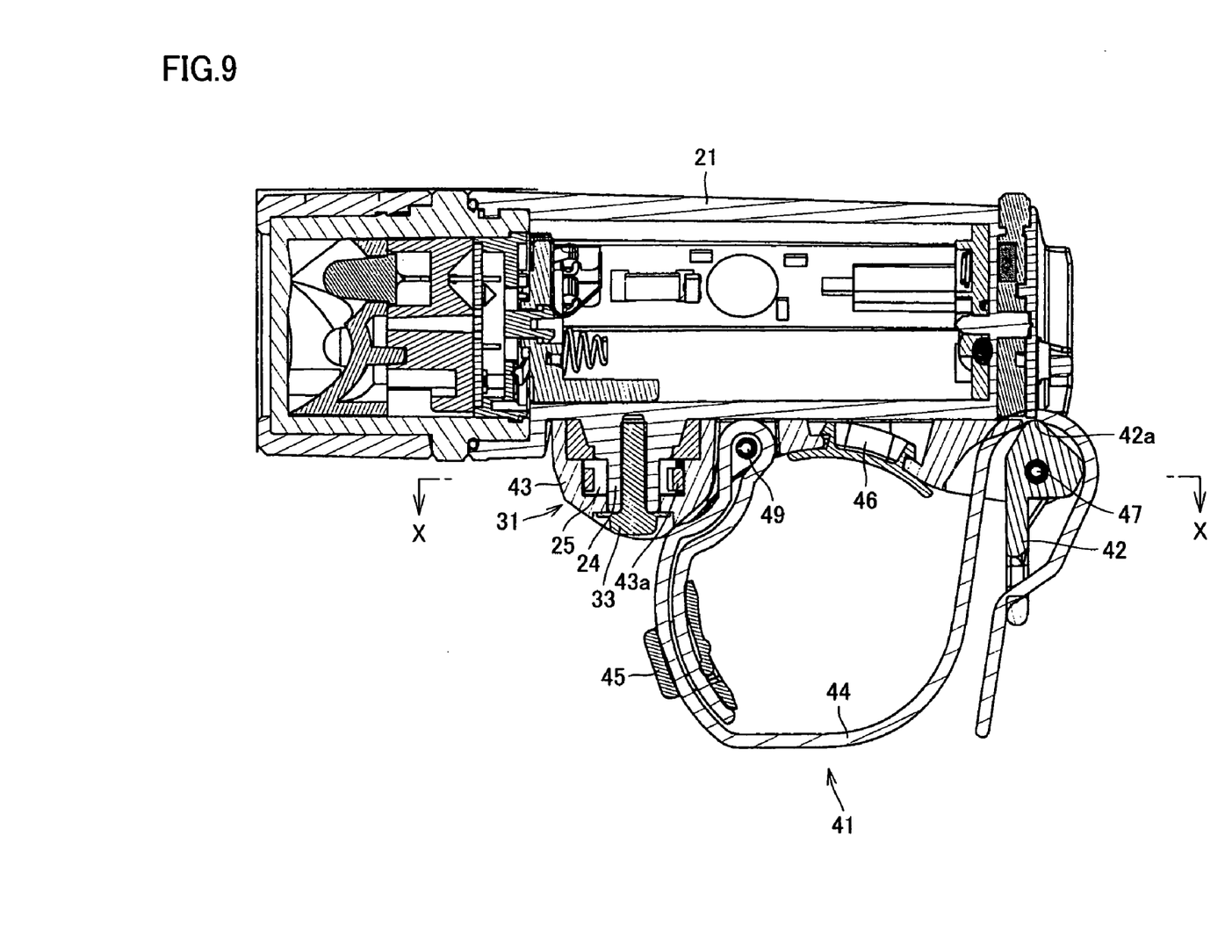
FIG. 9 is a sectional view of the illumination apparatus of FIG. 1 including a support unit.

FIG. 9 shows insertion shaft 24 protruding from bottom 21a of casing 21 inserted into support member 31, and secured with a bolt 33. Bolt 33 is screwed into insertion shaft 24. The collar of this bolt 33 prevents rotation shaft support member 43 from being detached. Rotation shaft support unit 43 or support unit 31 can rotate about insert member 24 and bolt 33.

Figure 10:
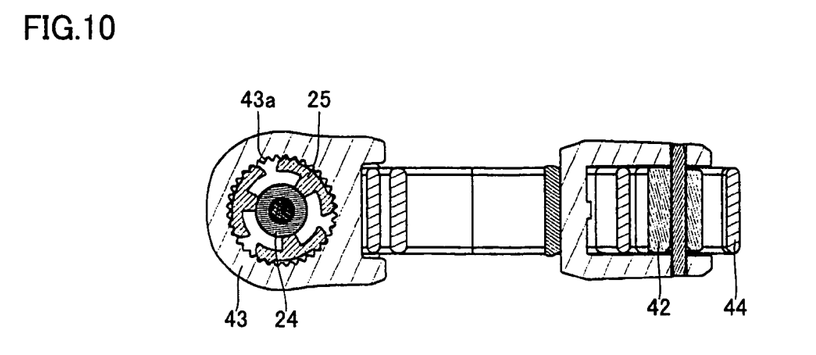
FIG. 10 is a sectional view of the illumination apparatus of FIG. 1 taken along line X—X of FIG. 9.

FIG. 10 is a sectional view of the illumination apparatus when viewed in the X direction of FIG. 9. An engagement member 25 is fixed to insertion shaft 24 protruding from the bottom of casing 21 in alignment with the core of the shaft. As shown in FIG. 10, engagement member 25 is formed of three partial annular regions, with the annular portion partially notched. A support member extending radially from insertion shaft 24 is coupled to each partial annular region. Concave and convex grooves are formed along the direction of thickness at the outer side of the partial annular region at both ends. These concave and convex grooves engage with the concave and convex grooves formed at the inner circumferential face of the concave portion of rotation shaft support member 43 in support member 31. This engagement is weak, and the protruding portion of engagement member 25 can be shifted to an adjacent concave groove in the inner circumference through rotation by the finger tip. In other words, support member 31 can be rotated about rotation shaft 33 while receiving discontinuous resistance. The rotation is realized by repeating engagement and detachment at a pitch of a small angle. By reducing the serrated step of the concave and convex grooves at the inner circumferential face, the angle between the illumination apparatus supported by the support member and that support member can be altered arbitrarily to maintain an appropriate position by the engagement set forth above.

Returning to FIG. 9, fixture band 41 will be described here. Fixture band 41 is wound around a target object by band 44, a target object adaptive member 46, and a band fastening member 45 to secure the illumination apparatus. The site where band 44 is arranged will be described. At the site where the wedge rotation shaft 49 is provided, an opening is formed at the upper region. The bottom of the casing is exposed at that opening. Band 44 is passed through the gap between wedge rotation shaft 49 and the casing exposed at the opening. The double overlapping portion of band 44 is clamped by band fastening member 45. This double overlapping portion corresponds to the adjustment of the length of the band wound around the target object. The other end of the band is passed through the gap between a rotation shaft 47 to which a lever stopper 42 is attached rotatably and casing 21. Lever stopper 42 includes a band urge portion 42a that has a maximum value of the distance from rotation shaft 47 to the outer circumferential face. When the lever is operated so that the portion of the maximum value is located facing casing 21, the smallest gap between casing 21 and lever stopper 42 can be achieved. The band can be secured by sandwiching the band between casing 21 and band urge portion 42a when the gap is smallest. Lever stopper 42 is configured to maintain a stable position in the aforementioned sandwiched state.

Figure 11:
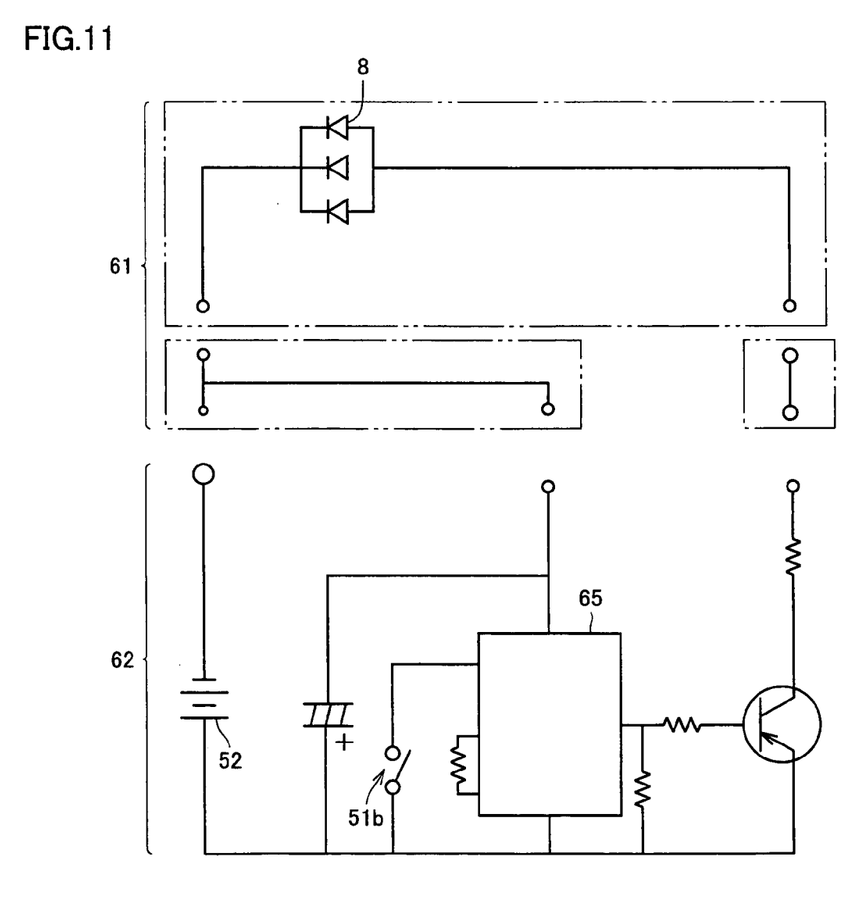
FIG. 11 represents a circuit in which a switch is incorporated.

The switch will be described hereinafter. FIG. 11 represents the wiring of the electrical system of the illumination apparatus in which a switch is incorporated. In the wiring diagram of FIG. 11, a portion 61 including LED 8 corresponds to the front portion of FIG. 8. A portion 62 including an electric component such as a battery 52 corresponds to the casing of FIG. 6 and a portion 62 therein. When front portion 61 of FIG. 8 is inserted into casing portion 62 and electrical connection is established, portion 61 and portion 62 of FIG. 11 attain an electrically-connected status. A reed switch 51b opens/closes by operating switch operation unit 51a.

A permanent magnet identified as the magnetomotive force is attached to switch operation unit 51a so as to operate in cooperation. Reed switch 51b of the circuit has a resilient soft magnetic piece arranged apart from a fixed soft magnetic piece so that the resilient soft magnetic piece is OFF. By moving switch operation unit 51a to shift the position of the permanent magnet, the soft magnetic piece is magnetized to cancel the gap from the fixed soft magnetic piece to form a closed magnetic circuit. Specifically, the soft magnetic piece forms contact with the corresponding fixed soft magnetic piece by the magnetic force, whereby reed switch 51b is turned on.

IC circuit 65 of FIG. 11 can have the lit pattern of the LED and the switch operation set in a predetermined corresponding relationship. For example, at the initial state where the switch is OFF, the "turn off" state is achieved with no current supplied to the LED. Then, switch 51 can be moved to turn on the contact, and supply current to the LED when returning to the OFF state to attain a "lit" state. Furthermore, current can be supplied at a predetermined cycle to the LED to attain a "blinking" state when switch 51 is moved so that the contact returns to ON.

By employing the illumination apparatus set forth above, light can be emitted forwardly with favorable directivity, and light can be transmitted also from the side region. Transmission of light from the side region is advantageous in that a vehicle approaching from the side, particularly an automobile, can easily perceive the light even in a dark environment. This advantage is particularly preferable from the standpoint of safety.

The embodiment of the present invention will be summarized hereinafter including the above description.

The light path modify unit set forth above is a light guide formed of a material having a refractive index higher than that of air. Light emitted from a light emitting diode enters the light guide from one end thereof, totally reflected to change its direction of travel, and then output from the light emitting face of the light guide towards the side transmission unit. In the above-described embodiment, the transmission unit is provided along the entire circumference of the side. However, the transmission unit does not have to be provided continuously along the entire surface. A transmission portion may be disposed at a predetermined angled pitch over the entire circumference.

By such a structure, light can be emitted sidewards from the side peripheral region taking advantage of light emitted from the light emitting diode backwards, for example. The configuration of each component is selected and arranged so that the light towards the light guide emission face strikes the emission face at an incident angle smaller than the critical angle of total reflection.

The light path modification unit may be a reflective member to reflect light output from the light emitting diode towards the side transmission unit.

By using such a reflective member, the light from the back side of the light emitting diode can be altered in the direction of travel so as to advance towards the side portion to allow light to be emitted from the side circumferential region.

In the light emitting diode, the luminous unit may have a transparent material of a refractive index higher than that of air sealed in a bullet configuration, wherein the front portion at the transparent emission window side forms a convex surface, and the trailing end is flat. The trailing end may be exposed at the light path modify unit.

The above-described structure is advantageous in that, when the light path modify unit is formed of a light guide, a flat incident portion of the light guide facing the flat trailing end allows light output from the light emitting diode to be incident efficiently upon the optical guide. For example, when a front window is provided, the light collecting function of the front window can be set to a light level, or absent of a light collection function. As a result, the cost of the front window component can be reduced.

A structure may be employed in which an insertion hole is provided into which the light emitting diode is inserted, and a reflection mirror of concave face surrounding the luminous unit from the back side with the light emitting diode inserted and wired is provided.

By such a structure, the directivity of light distribution in the front direction can be improved.

A plurality of the above-described light emitting diodes may be provided. A reflection mirror of a concave face is provided for each light emitting diode. A structure can be employed in which each reflection mirror having a light emitting diode inserted does not exceed the crossing line with an adjacent reflection mirror.

By using a reflection mirror of a concave face for each group of a plurality of light emitting diodes, light distribution of high directivity in the front direction can be achieved while ensuring high luminance. The number of light emitting diodes is arbitrary as long as at least two are provided.

The lead terminal through which a current is introduced to the luminous unit may be drawn out from the trailing end of the light emitting diode. The lead line connected to that lead terminal may pass through the light path modify unit so as to be connected to a battery located at the rear of the side peripheral transmission unit.

Since thin lead terminals and lead lines can be used, no appreciable blocking of light by the lead terminal and lead line will be encountered during the passage from the light emitting diode to the side peripheral unit. By virtue of the light emitting diode, an opaque sealing portion, socket, or the like are not required, as compared to a light bulb. Since only the lead terminal is a non-transparent portion, lead terminal and the like will not block light. Therefore, light emission in the rear direction can be used efficiently.

The illumination apparatus can include, an insertion shaft protruding from the casing at the side portion of the casing, closer to the central area than the side transmission unit, a rotation engagement member fixed to the insertion shaft, and identified as a rotary plate having concave and convex grooves at the circumferential edge and crossing the insertion shaft, and a support member inserted in said insertion shaft, having concave and convex grooves at the inner circumferential side engaging with the concave and convex grooves at the circumferential edge of the rotation engagement member, rotatable about the rotation engagement member while maintaining engagement with the concave and convex grooves of the rotation engagement member.

By reducing the serration step of the concave and convex grooves, the front projection window can be directed in a desired direction of angle, and maintain that direction with the engagement force of the engagement grooves.

A support member supporting the illumination apparatus is provided at the side circumference (bottom) of the casing. The support member includes a fixture band member that secures the illumination apparatus to a target object. The fixture band member includes a first band engagement portion and a second band engagement portion about which the band to secure the illumination apparatus to the target object is folded to overlap. The band portion between the first and second band engagement portions secures the illumination apparatus to the target object so as to wrap around the object. The first band engagement portion is provided with a first shaft that has a first gap from the casing. The first band engagement portion includes a wedge stopper provided rotatably about the first shaft, biting into the serrated groove provided at one end of the band. One end of the band is arranged to pass the first gap such as to be folded about the first shaft with the serrated groove facing the first shaft. The second band engagement unit is provided with a second shaft with a second gap from the casing. The second band engagement unit includes a lever stopper provided rotatably about the second shaft. The lever stopper includes a lever and a band urge portion. The band urge portion has a circumferential edge taking a maximum value of the distance from the second axis. The other end of the band passing through the second gap can be sandwiched and fixed between the circumferential edge taking the maximum value and the casing by pushing down the lever.

By the structure set forth above, an illumination apparatus can be fixed readily and firmly to a target object by the band.

A switch operation unit is provided, located at a side circumferential portion of the casing at the end opposite to the front projection window. The switch operation unit rests at a state where biasing force is applied in one circumferential direction, for example, in a state where resilient force is applied. When the switch operation unit is slid in a direction opposite to the circumferential direction against the biasing force, the magnet in cooperation with the switch operation unit moves so as to approach the reed switch in the casing. The reed switch includes a soft magnetic piece having a degree of freedom in deformation so as to function as a switch terminal, and a fixed soft magnetic piece connected to the soft magnetic piece. When the magnet approaches the soft magnetic piece by the shift of the switch operation unit, the soft magnetic piece is magnetized, and forms contact with the fixed soft magnetic portion arranged in close proximity to the soft magnetic piece to form a closed magnetic circuit. By formation of such a closed magnetic circuit, the make-break contact is turned on.

By the structure set forth above, the switch can take a simple configuration of relatively few components. As a result, an illumination apparatus of high reliability, that does not breakdown readily, can be provided economically.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An illumination apparatus attached to a casing, comprising:
   a light emitting diode located at a front region of said illumination apparatus, corresponding to one end of said casing,
   a side transmission unit having a surface exposed at a gap in said casing, located rearward of said light emitting diode to transmit light from a side portion, and
   a light path modification unit located at a rear of said light emitting diode to alter a direction of light emitted from said light emitting diode to output light towards said side transmission unit and
   further comprising a reflection mirror of a concave face, including an insertion hole in which said light emitting diode is inserted, surrounding a luminous unit of said light emitting diode from the back side thereof under a state where said light emitting diode is inserted and wiring is established.

2. The illumination apparatus according to claim 1, wherein said light path modification unit is a light guide formed of a material having a refractive index higher than the refractive index of air to provide the light output from said light emitting diode into the light guide at an end portion of the light emitting diode side, totally reflecting the light to alter the direction of travel of light, and emitting light from a light guide emission face towards said side transmission unit.

3. An illumination apparatus attached to a casing, comprising:
   a light emitting diode located at a front region of said illumination apparatus, corresponding to one end of said casing,
   a side transmission unit having a surface exposed at a gap in said casing, located rearward of said light emitting diode to transmit light from a side portion, and
   a light path modification unit located at a rear of said light emitting diode to alter a direction of light emitted from said light emitting diode to output light towards said side transmission unit,
   wherein said light path modification unit is a light guide formed of a material having a refractive index higher than the refractive index of air to provide the light output from said light emitting diode into the light guide at an end portion of the light emitting diode side, totally reflecting the light to alter the direction of travel of light, and emitting light from a light guide emission face towards said side transmission unit, and
   wherein a lead terminal of said light emitting diode is drawn out from the rear of said light emitting diode, and passes through said light guide to be connected to a wiring board located at a rear side of said guide light.

4. An illumination apparatus attached to a casing, comprising:
   a light emitting diode located at a front region of said illumination apparatus, corresponding to one end of said casing,
   a side transmission unit having a surface exposed at a gap in said casing, located rearward of said light emitting diode to transmit light from a side portion, and
   a light path modification unit located at a rear of said light emitting diode to alter a direction of light emitted from said light emitting diode to output light towards said side transmission unit and comprising an insertion shaft protruding from said casing at a side portion of said casing, closer to a central area than said side transmission unit, a rotation engagement member fixed to said insertion shaft, identified as a rotary plate crossing said insertion shaft and having concave and convex grooves at a circumferential edge, and a support member inserted in said insertion shaft, and having concave and convex grooves at an inner circumferential side engaging with the concave and convex grooves at the circumferential edge of said rotary engagement member, rotatable about said rotary engagement member while engaging with the concave and convex grooves of said rotary engagement member.

5. An illumination apparatus attached to a casing, comprising:
   a light emitting diode located at a front region of said illumination apparatus, corresponding to one end of said casing, a side transmission unit having a surface exposed at a gap in said casing, located rearward of said light emitting diode to transmit light from a side portion, and a light path modification unit located at a rear of said light emitting diode to alter a direction of light emitted from said light emitting diode to output light towards said side transmission unit and comprising a support member supporting said illumination apparatus at a side circumferential portion of said casing, wherein said support member comprises a fixture band member fastening said illumination apparatus to an object of attachment by a band, said fixture band member including a first band engagement portion and a second band engagement portion about which the band to fasten the illumination apparatus to said object of attachment is folded to overlap, a portion of said band between said first and second band engagement portions fasten said illumination apparatus to said object of attachment by wrapping around said object of attachment, said first band engagement portion provided with a first shaft having a first gap from said casing, and including a wedge stopper provided rotatably about said first shaft to bite into a serration groove provided at one end of the band, said one end of said band arranged so as to pass through said first gap and be folded about said first shaft with said serration groove facing said first shaft, said second band engagement portion provided with a second shaft having a second gap from said casing, and including a lever stopper provided rotatably about said second shaft, and having a lever portion and a band urge portion, said band urge portion having a circumferential edge portion taking a maximum value of a distance from said second shaft, and the other end of said band inserted into said second gap being sandwiched and fixed between an edge circumferential portion taking the maximum value and said casing by pushing down said lever.

6. An illumination apparatus attached to a casing, comprising:

a light emitting diode located at a front region of said illumination apparatus, corresponding to one end of said casing, a side transmission unit having a surface exposed at a gap in said casing, located rearward of said light emitting diode to transmit light from a side portion, and a light path modification unit located at a rear of said light emitting diode to alter a direction of light emitted from said light emitting diode to output light towards said side transmission unit and comprising a switch operation unit located at a side circumferential portion of the casing at an end portion opposite to said front portion, said switch operation unit resting at a state where resilient force is applied in one circumferential direction, wherein when said switch operation unit is slid in a direction opposite to said one circumferential direction against the resilient force, a magnet connected with said switch operation unit moves at a switch portion in said casing, approaches a deformable soft magnetic piece, provided at said switch, makes said deformable soft magnetic piece touch a fixed soft magnetic piece arranged in proximity to said deformable soft magnetic piece such that said deformable soft magnetic peace and said fixed soft magnetic piece form a closed magnetic circuit, and a make-break contact is turned on.

* * * * *